United States Patent Office 2,761,819
Patented Sept. 4, 1956

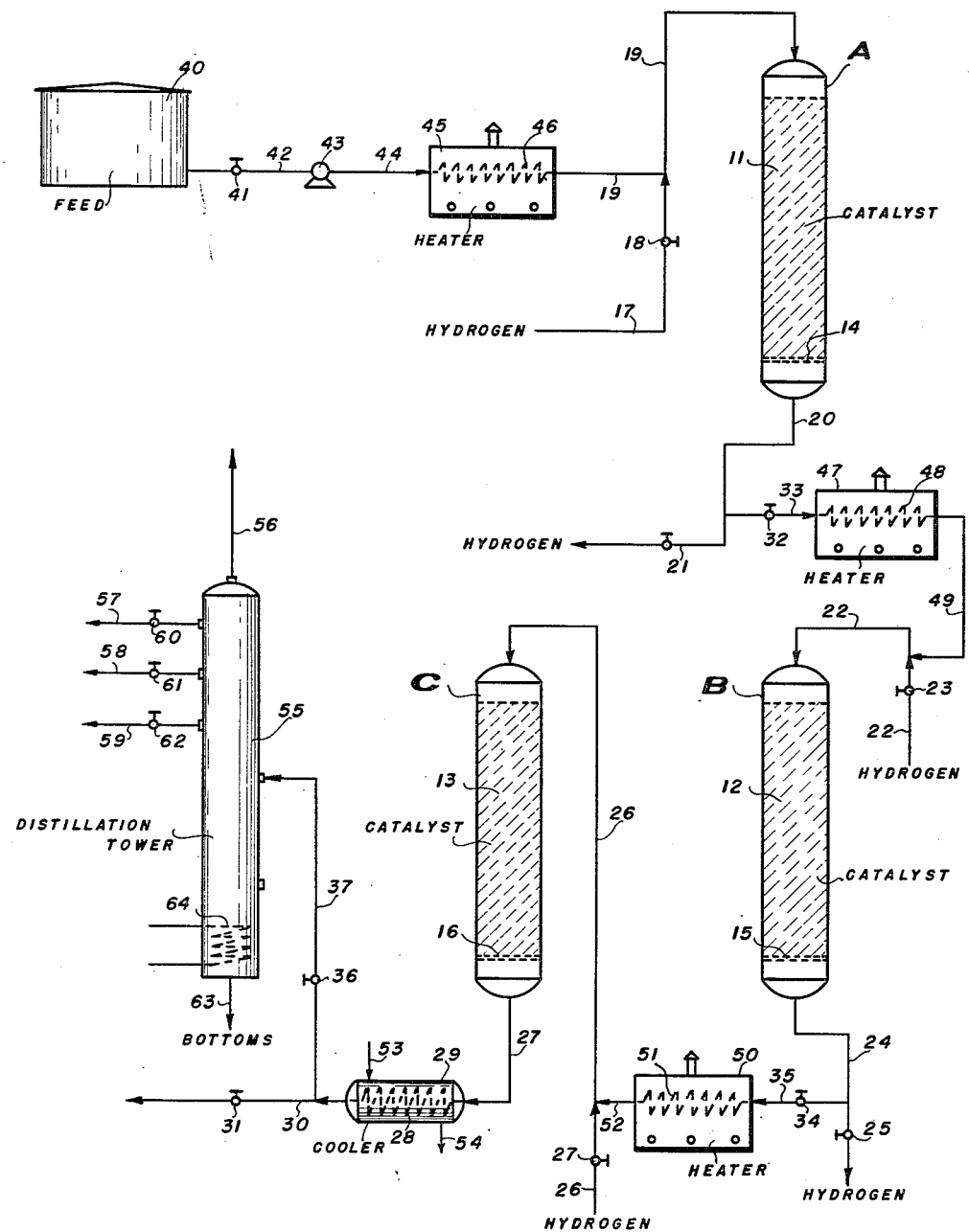

2,761,819

METHOD FOR CONVERTING HYDROCARBONS WITH A PLATINUM-ON-ALUMINA CATALYST

James A. Dinwiddie and Max A. Mosesman, Baytown, Tex., assignors, by mesne assignments, to Esso Research and Engineering Company, Elizabeth, N. J., a corporation of Delaware Application March 6, 1953, Serial No. 340,893

8 Claims. (Cl. 196—50)

The present invention is directed to a method for converting hydrocarbons. More particularly, the invention is directed to a method for converting hydrocarbons by contacting a hydrocarbon with a platinum on alumina catalyst. In its more specific aspects, the invention is concerned with a high temperature treatment of a platinum on alumina catalyst and subsequent conversion of hydrocarbons by passing same over said treated catalyst.

The present invention may be briefly described as involving a method for converting hydrocarbons in which a hydrocarbon boiling in the range from about 100° to about 500° F. is contacted with a platinum on alumina catalyst which has been treated with hydrogen at a temperature in the range from about 1000° to 1300° F. for a time in the range from about 2 to 24 hours, hydrogen being preferably employed in admixture with the hydrocarbon.

The catalyst employed in the practice of the present invention is a platinum on alumina catalyst. The catalyst may have platinum deposited on alumina derived from either boehmite or bayerite or on commercially available catalytic grades of aluminum with or without a stabilizing agent such as, for example, silica. The platinum on alumina catalyst may suitably be prepared from an aluminum alcoholate formed by reacting an aliphatic alcohol, such as one having from 1 to 10 carbon atoms, with aluminum metal, such as aluminum turnings. The aluminum metal reacts with alcohols such as, for example, methyl, ethyl, propyl, butyl, amyl, hexyl, heptyl, and octyl alcohols and the like at a temperature in the range from about 75° to 250° F. Thereafter, the aluminum alcoholate may be contacted with atmospheric moisture at atmospheric temperature, or it may be contacted with steam at, or at a temperature above, the boiling point of water, or it may be contacted with water at a temperature no less than the temperature at which water boils. The contacting operation with boiling water may be at reduced pressures such that water boils below 212° F.

The boehmite is produced under slow and controlled conditions of hydrolysis in which moisture contacts the aluminum alcoholate in quantities only sufficient to hydrolyze the alcoholate to the hydrate boehmite. The catalytic material, such as platinum, is intimately admixed with the hydrate boehmite, the admixture dried to remove any moisture and alcohol, and the admixture then subjected to a high temperature in the range of from 600° to 1600° F. to convert the boehmite to gamma alumina and to form a platinum on gamma alumina catalyst.

If it is desired to incorporate the catalytic material directly on gamma alumina, the boehmite is first heated to a temperature in the range of 1000° to 1600° F. to convert the boehmite to gamma alumina. The catalytic material is then intimately admixed with the gamma alumina derived from boehmite and subjected to another heating operation to drive off water and to form a platinum on gamma alumina catalyst.

If it is desired to employ bayerite as the support for the catalyst, the aluminum alcoholate may be hydrolyzed by the addition of excess liquid water to obtain this trihydrate. After drying at 230° F., the catalytic material, such as platinum, may be incorporated with the bayerite and the mixture heated to a high temperature to convert the trihydrate to gamma alumina to yield a platinum on gamma alumina catalyst. Alternately, the bayerite may be first heated to a temperature in the range of from 1000° to 1600° F. to obtain a gamma alumina on which the catalytic material may then be incorporated in a manner similar to that described above.

In addition to the use of boehmite, bayerite and the gamma aluminas which are derivable from these hydrates as support components of the catalyst, commercially available catalytic grades of alumina, both in hydrated and anhydrous forms, may be similarly utilized. Incorporation of the catalytic materials such as platinum on such commercially available aluminas may be carried out in a manner similar to the procedures described supra.

It is contemplated in the practice of the present invention that while it is preferred to use platinum or platinum-containing compounds, other metals or metallic compounds may also be incorporated in the catalyst. These metals include palladium, rhodium, ruthenium, iridium, and osmium. The procedures for incorporating these metals is identical with those that have been described in the case of platinum.

In the process of the present invention, the temperatures of the conversion operation may suitably range from 850° to 1000° F. while pressures may suitably range from 200 to 700 p. s. i. g. Hydrogen employed in the conversion operation will range from about 2000 to about 10,000 standard cubic feet per barrel of feed. The hydrocarbon may contact the catalyst at a space velocity from about 1 to 5 volumes of feed per volume of catalyst per hour; preferably, however, 2 to 3 volumes of feed per volume of catalyst per hour may be used.

It is contemplated, in the process of the present invention, that, prior to the reaction cycle, a pretreatment of the catalyst with hydrogen or a gas rich in hydrogen in the temperature range of the reaction, initially at atmospheric pressure for 15 minutes to 1 hour and finally at reaction pressure may be practiced. Thereafter the high temperature hydrogen treatment follows.

In the high temperature hydrogen treatment step of the present invention, the hydrogen will contact the catalyst at a temperature in the range from about 1000° to 1300° F. and at atmospheric pressure for a time in the range from 2 to 24 hours. Good results are obtained with contact times in the range from 12 to 24 hours at 1250° F. in contact with hydrogen. Pressures employed in the high temperature hydrogen treatment may range from about 0 to 200 pounds p.s i. g. with atmospheric pressure preferred.

The amount of hydrogen employed in the pretreating operation will be in the range from about 1000 to 5000 volumes per volume of catalyst per hour.

The hydrocarbon employed as a feed stock in the process of the present invention may be a hydrocarbon boiling from about 100° to about 500° F. and suitably may be a paraffinic hydrocarbon, a naphthenic hydrocarbon, an olefinic hydrocarbon, or a mixture thereof. It is preferred to use naphthenic hydrocarbons as a feed stock since the catalyst employed in the present invention converts the naphthenic hydrocarbons readily to aromatic hydrocarbons. Actually the feed stock may suitably be a mixture of paraffinic and naphthenic hydrocarbons which may be converted to the more desirable hydrocarbons. Actually in the process of the present invention, normal paraffinic hydrocarbons may be converted to desirable isoparaffin hydrocarbons.

In the high temperature hydrogen treating operation in which hydrogen is contacted with the catalyst at a temperature in the range from about 1000° to 1300° F., the temperature may be raised gradually to the temperature in the range given and hydrogen allowed to flow in contact with the catalyst for a period of time indicated at the temperature selected. Thereafter the hydrogen rate may be decreased slightly while the temperature is maintained. After the hydrogen treatment, the flow of hydrogen is replaced by a flow of a mixture of a heated hydrocarbon and hydrogen at the conversion temperatures indicated.

Suitably the high temperature hydrogen treatment may follow a regeneration in which the catalyst is contacted with an oxygen-containing gas. Such regeneration may involve a temperature in the range from about 800° to 1200° F. which causes the combustion of carbonaceous bodies which may be deposited on the catalyst. It is contemplated in the practice of the present invention that the high temperature hydrogen treating operation may be interposed between the regenerating operation and the reaction cycle. Such regenerating and high temperature hydrogen treating operations employing a platinum on gamma alumina catalyst ordinarily will take up from about 1 to 10% of the operating time, the remainder being on reaction with the hydrocarbon and hydrogen in contact with the catalyst. After the hydrogen treatment, the temperature is reduced to the desired reaction temperature, the flow rate and pressure of the hydrogen is adjusted to reaction conditions, and the preheated hydrocarbon feed is then introduced. It is understood that appropriate flushing with inerts, as is commonly practiced, is conducted between the reaction, regeneration, and high temperature hydrogen treating steps.

The present invention will be further illustrated by reference to the drawing in which the single figure is a flow diagram of one mode of practicing the invention. Referring now to the drawing, A, B and C designate identical reaction zones in which are arranged, respectively, beds 11, 12 and 13 of a platinum on gamma alumina catalyst which are supported, respectively, on grid plates 14, 15 and 16. In practicing the present invention prior to the actual reaction cycle, hydrogen preheated to the desired temperature is introduced into the system through line 17 controlled by valve 18 into line 19 and allowed to pass downwardly through bed 11 which is maintained by means, not shown, at a temperature in the range indicated. The hydrogen passes outwardly from reaction zone A by way of line 20 controlled by valve 21.

Similarly, hydrogen may be introduced into reaction zone B by line 22 controlled by valve 23 at a temperature in the range from 1000° to 1300° F., the temperature of reaction zone B being maintained by means not shown. The hydrogen is allowed to contact the catalyst 12 in zone B for a time in the range indicated, the hydrogen passing outwardly from zone B by line 24 controlled by valve 25.

Reaction zone C is similarly treated by introducing hydrogen by line 26 controlled by valve 27 which allows hydrogen to pass through line 26 to bed 13 in zone C, the hydrogen passing outwardly therefrom by line 27 and through coil 28 in cooler 29 and then from the system by way of line 30 controlled by valve 31.

After the beds 11, 12, and 13 have been treated for a time and at a temperature indicated, the temperature is decreased to the desired reaction temperature, and the flow of hydrogen as such is terminated by closing off valves 18, 23, and 27, valves 21, 25 and 31 also being closed. Hydrogen pressure and flow is established by opening valves 18 and 32 in line 33, valve 34 in line 35, and valve 36 in line 37.

A feed hydrocarbon is introduced into the system from tank 40, valve 41 in line 42 being opened so pump 43 may take suction on tank 40. The feed is pumped by line 44 into a heater or furnace 45 which contains a coil 46. In heater 45 the temperature of the feed hydrocarbon is raised to about 975° F., and then the heated feed passes outwardly through line 19 to reaction zone A. Preheated hydrogen is introduced into the heated and vaporized feed flowing through line 19 by open valve 18 in line 17.

The mixture of hydrocarbon and hydrogen passes downwardly through catalyst 11 which causes at least partial conversion of the hydrocarbons. This reaction is endothermic and involves consumption of heat which results in a temperature drop through the bed to about 850° F. It is thereafter necessary to reheat the partially converted product which is passed through line 20 to line 33 in a heater or furnace 47 containing a coil 48 which raises the temperature of the partially converted product back up to about 975° F. The product emerges from heater 47 by line 49 which connects into line 22 and routes the partially converted product to reaction zone B.

In reaction zone B, the hydrocarbons are further converted and, similar to reaction zone A, a temperature drop is suffered by the endothermic reaction which causes the temperature to drop to 900° F. in the bed on passage of the hydrocarbon therethrough. The further converted hydrocarbons emerge from zone B by line 24 and pass by line 35 into a heater or furnace 50 containing a coil 51 wherein the temperature of the converted product is raised back to 975° F. The reheated products leave furnace 50 by line 52 which connects into line 26 and serves to discharge the converted product into zone C for further conversion. The finally converted products pass through bed 13 and outwardly therefrom to line 27 into cooler or condenser 29 through which circulates a cooling fluid, such as water, by lines 53 and 54, the products from cooler 29 being routed through line 37 to a distillation zone 55 which is a precise fractional distillation tower equipped with all the required auxiliary distillation equipment such as condensers, heaters, reflux means and the like. Distillation tower 55 is provided with internal vapor-liquid contacting means to provide intimate contact between the ascending vapors and the descending liquids to allow precise separation of the products. Distillation tower 55 is provided with line 56 for removal of fixed gases and with lines 57, 58 and 59 controlled, respectively, by valves 60, 61 and 62 for withdrawal of side streams, as desired. Tower 55 is also provided with line 63 for withdrawal of a bottoms fraction and with a heating means illustrated by a steam coil 64 for adjustment of temperatures and pressures and to allow the separation desired. It is to be understood that zone 55 may include flash vaporization facilities. Further, it is contemplated that the off gases from zone 55 which contain hydrogen may be recycled and used in lieu of fresh hydrogen.

It will be seen from the foregoing description taken with the drawing that we have provided a process in which the catalyst may be treated at temperatures mentioned prior to contacting the catalyst with the hydrocarbon in the presence of hydrogen to obtain the desired beneficial results.

The invention will be further illustrated by comparative runs in a reformer in which the same hydrocarbon was reformed in both runs at 900° F., 275 p. s. i. g., a space velocity of hydrocarbon of 3 volumes of feed per volume of catalyst per hour, and employing 3000 volumes of $H_2$ per volume of catalyst per hour. In one case the catalyst was given the usual hydrogen pretreat which was followed by the treatment in accordance with the present invention. In the other instance, the catalyst was given only the hydrogen pretreat at low temperatures.

The conventional hydrogen pretreatment with a freshly charged catalyst involves treatment of the catalyst with hydrogen at a rate of 3000 v./v./hr. and 0 p. s. i. g. during a 12 to 16 hour period in which the temperature is increased 100° F. per hour from room temperature to a temperature of 400° F. and then increased 50° F. per hour to 900° F. The latter temperature is maintained for 15 minutes to 1 hour. It is to be understood that the indicated heating rates are not to be considered critical; other convenient heating rates may be satisfactory. In the present invention, the usual pretreatment was followed by our improvement which involved continuation of the latter heating rate to a temperature of about 1250° F. with hydrogen flowing at about 3000 v./v./hr. At 1250° F., the flow was maintained at this rate for 12 hours and then the rate was reduced to 1500 v./v./hr. while the temperature was maintained at 1250° F. for 11 hours.

The data from the comparative runs are given in the following table in which the first two columns of data represent the present invention and the second two columns of data represent the prior art.

Table

| Catalyst | Platinum on Alumina | | | |
|---|---|---|---|---|
| Normal H₂ Pretreat | Yes | | Yes | |
| 1250° F. H₂ Treat | Yes | | No | |
| Hours on Stream | Yld. Unstab. Liq., Vol. Percent | O. N., Res. Clear | Yld. Unstab. Liq., Vol. Percent | O. N., Res. Clear |
| 2 | 83.1 | 88.5 | 83.6 | 79.4 |
| 4 | 84.7 | 88.2 | 85.9 | 77.6 |
| 6 | 86.8 | 86.1 | 89.1 | 75.1 |
| 8 | 88.3 | 84.0 | 88.5 | 73.6 |
| 10 | 92.3 | 81.9 | 88.1 | 72.6 |
| 12 | 89.8 | 82.8 | 89.1 | 70.8 |
| 14 | 89.0 | 82.2 | 89.9 | 69.6 |
| 16 | 92.3 | 76.7 | 89.4 | 68.9 |
| 18 | 93.0 | 76.6 | 90.5 | 66.8 |
| 20 | 91.8 | 74.8 | 90.7 | 63.6 |

From these data, it will be noted that the high temperature hydrogen pretreat results in a 9 to 12 octane number improvement throughout the first 20 hours of operation. Moreover, the data show that the enhancement in octane number is not accompanied by any impairment in yield. It is believed that for a given octane number level, the hydrogen treatment at high temperatures may result in a significant reduction in the rate at which the activity of the catalyst declines.

It is within the scope of our invention to combine the high temperature hydrogen treatment with the usual regeneration procedure with the high temperature hydrogen treatment interposed between regeneration and conversion.

The nature and objects of the present invention having been completely described and illustrated, what we wish to claim as new and useful and to secure by Letters Patent is:

1. A method for converting hydrocarbons which comprises containing a catalyst consisting of platinum on alumina with hydrogen in an amount in the range from about 1000 to 5000 volumes per volume of catalyst per hour at a temperature in the range from about 1000° F. to 1300° F. for a sufficient length of time in the range from about 2 to 24 hours, terminating contact of hydrogen with said catalyst, and then contacting said hydrogen-contacted catalyst with a hydrocarbon at a temperature in the range from 850° to 1000° F. in the presence of hydrogen to convert said hydrocarbon to a product of higher octane number and yield than that obtainable without said hydrogen contact time, the hydrogen contact time being in the range from about 1% to 10% of the total contact time and the remainder of the total contact time being contact with hydrogen and said hydrocarbon.

2. A method in accordance with claim 1 in which the alumina is a gamma alumina derived from boehmite.

3. A method in accordance with claim 1 in which the alumina is derived from bayerite.

4. A method for converting hydrocarbons which comprises contacting a catalyst consisting of platinum on alumina with hydrogen in an amount in the range from about 1000 to 5000 volumes per volume per hour at a temperature in the range from about 1000° to 1300° F. for a sufficient length of time in the range from about 2 to 24 hours and then replacing the hydrogen with a mixture of hydrocarbon and hydrogen in contact with said catalyst at a temperature in the range from 850° to 1000° F. to convert said hydrocarbon to a product of higher octane number and yield than that obtainable without said hydrogen contact time, said hydrogen contacting said catalyst during a period of time from about 1% to 10% of the total contact time and said mixture of hydrocarbon and hydrogen contacting the catalyst during a period of time from about 90% to 99% of the total contact time.

5. A method for converting a hydrocarbon boiling in the range from about 100° to 500° F. which comprises contacting a catalyst consisting of platinum on alumina with hydrogen in an amount in the range from about 1000 to 5000 volumes per volume of catalyst per hour at a temperature in the range from about 1000° to 1300° F. for a time in the range from about 2 to 24 hours amounting to from about 1% to 10% of the total contact time, terminating contact of hydrogen with said catalyst, and then contacting said hydrogen-contacted catalyst with said hydrocarbon at a temperature in the range from 850° to 1000° F. in the presence of hydrogen at a sufficient pressure and for a sufficient length of time amounting to from about 90% to 99% of the total contact time to convert said hydrocarbon to a product of higher octane number and yield than that obtainable without said hydrogen contact time, and recovering said converted hydrocarbon product.

6. A method in accordance with claim 5 in which the alumina is a gamma alumina derived from boehmite.

7. A method in accordance with claim 5 in which the pressure is in the range from 200 to 750 p. s. i. and the hydrocarbon is contacted with the catalyst at a space velocity from about 1 to 5 volumes of feed per volume of catalyst per hour.

8. A method in accordance with claim 5 in which the catalyst is contacted with hydrogen at a pressure in the range between 0 and 200 pounds per square inch gauge.

References Cited in the file of this patent

UNITED STATES PATENTS

| 2,327,593 | De Simo | Aug. 24, 1943 |
| 2,472,844 | Munday et al. | June 14, 1949 |
| 2,479,110 | Haensel | Aug. 16, 1949 |
| 2,606,878 | Haensel | Aug. 12, 1952 |
| 2,636,865 | Kimberlin | Apr. 28, 1953 |
| 2,636,909 | Oblad et al. | Apr. 28, 1953 |
| 2,642,381 | Dickinson | June 16, 1953 |

FOREIGN PATENTS

| 577,008 | Great Britain | May 1, 1946 |

OTHER REFERENCES

"Thermal Transformation of Aluminas and Alumina Hydrates," Stumpf et al. pages 1398 to 1403, vol. 42, No. 7, July 1950, Ind. and Eng. Chem.